W. H. SAUVAGE.
SLACK ADJUSTER.
APPLICATION FILED JAN. 25, 1916.
1,227,952.
Patented May 29, 1917.
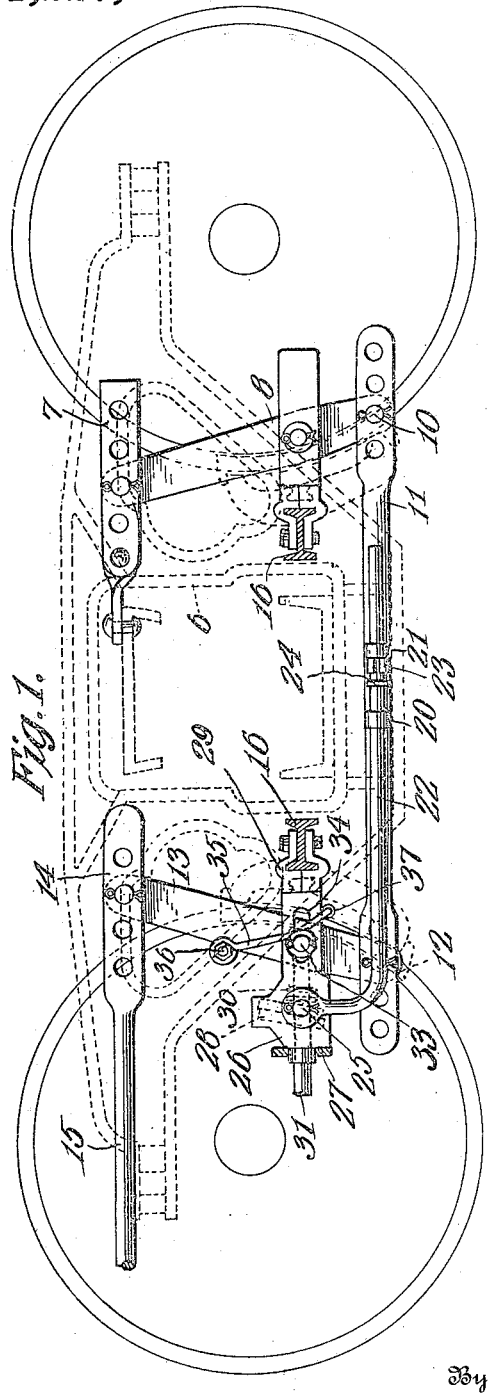
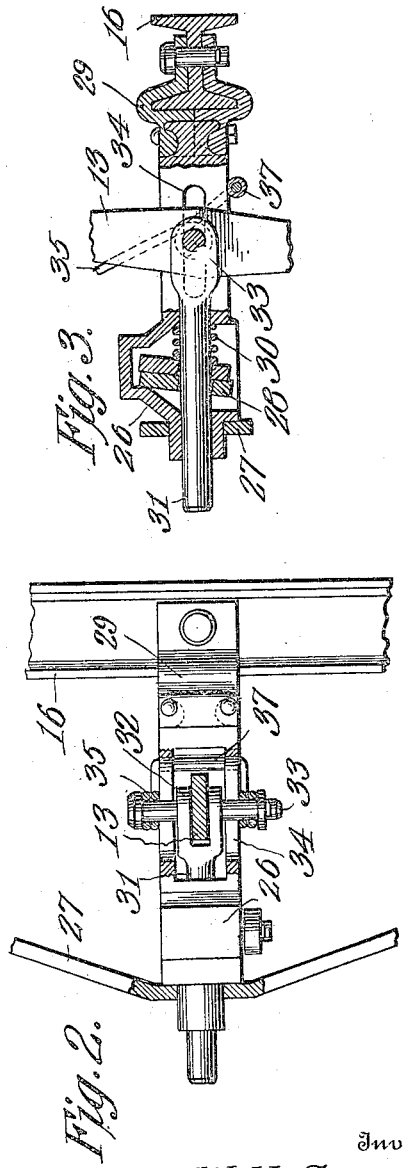
Inventor
W. H. Sauvage,
By
Attorney

UNITED STATES PATENT OFFICE.

WILLIAM H. SAUVAGE, OF FLUSHING, NEW YORK, ASSIGNOR TO GOULD COUPLER COMPANY, A CORPORATION OF NEW YORK.

SLACK-ADJUSTER.

1,227,952. Specification of Letters Patent. Patented May 29, 1917.

Application filed January 25, 1916. Serial No. 74,188.

*To all whom it may concern:*

Be it known that I, WILLIAM H. SAUVAGE, citizen of the United States, and resident of Flushing, in the county of Queens and State of New York, have invented certain new and useful Improvements in Slack-Adjusters, of which the following is a specification.

This invention relates to slack adjusters for the brake rigging of railway cars, and in its more intense aspect to automatic slack adjusters particularly adapted for use in connection with truck brake rigging.

One of the objects of the present invention is to provide a simple and practical slack adjuster particularly adapted for use with the brake rigging of trucks of standard make. Another object is to provide a slack adjuster of the above general character adapted for use with beam truck brake rigging which will be reliable and efficient in use and operation. A further object is to provide mechanism of the first above mentioned character having few parts and so constructed and arranged as to permit its ready application to the truck frame work without material modification or alteration.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a side elevation, partly in section, of such parts of a truck and associated brake rigging as are necessary to understand the present invention;

Fig. 2 is a plan view partly in section of a portion of the mechanism shown in Fig. 1;

Fig. 3 is a side elevation, partly in section, of the mechanism shown in Fig. 2.

Referring now to the drawings in detail and more particularly to Fig. 1, 6 denotes the truck frame work including a bolster of any desired type as shown in dotted lines provided at one side with an abutment or support 7 to which a dead lever 8 may be secured in any one of several desired positions. This dead lever is pivotally connected at its lower end 10 to one end of a solid push rod 11, the opposite end of which push rod is similarly connected at the point 12 to the lower end of live lever 13. The upper end of this live lever is connected to the bifurcated end 14 of pull rod 15. This end 14 is preferably extended to form an integral loop adapted to coact or engage with the truck frame 6 and limit the return movement of the live lever to normal position after application of the brakes. Both the live and dead levers are provided with brake beams 16 carrying shoes at their ends adapted to coact with the peripheries of the wheels of the truck. This mechanism is all of more or less well known character and operates in the usual manner.

In order to take up the slack due to wear of the brake shoes, for example, and maintain uniform piston travel, an automatic slack adjuster of the type hereinafter described is practically interposed between and associated with the brake beams. This mechanism comprises broadly a temporary take up and holding mechanism adapted to be actuated on excess travel of the brakes and a permanent holding mechanism actuated by the first mechanism on release of the brakes to permanently take up and hold the excess travel of the brake rigging due to wear of the parts. On the push rod 11 there is provided two lugs 20 and 21 spaced apart a few inches and provided with holes through which an adjusting rod 22 passes. This adjusting rod is provided with a friction clamp 23 firmly gripping the adjusting rod, and of a width less than the distance between the lugs 20 and 21. One or more washers 24 may be interposed between the clamp and one of the lugs if so desired to regulate the lost motion between the clamp and the lugs provided for the purpose of giving a normal brake shoe clearance.

The upper or opposite end of this rod 22 is pivotally mounted upon a stud 25 projecting from one side of a housing 26 mounted between the brake beam 16 and a coacting bow-shaped brace 27. Within this housing are located one or more dogs 28, normally held in canted position by means of a spring 30 surrounding a takeup or holding rod 31. This rod has a bifurcated end 32 embracing the live lever 13 and pivotally connected therewith by means of a pin 33 adapted to travel in slots 34 in the sides of the housing 26. This housing and dogs constitute a permanent take up and holding mechanism, and it is to be understood that other forms of positively acting devices such as ratchets, or the like, may be substituted to permit a relative telescopic movement of the rod 31, and housing 26, in one direction only and positively prevent opposite movement, that is, in the present case, a relative movement of the rod 31 toward the left, Fig. 2, on application of the brakes. This housing which really forms a part of the strut is preferably provided with a ball and socket connection with the fastening member 29 connecting it to the beam 16 to permit slight turning as may be necessary, as shown clearly in Fig. 3.

In order to restore the parts to normal position there is provided a return spring 35 of substantially U-shape construction, the upper ends of which are connected by means of a bolt 36 having a roller bearing against the side edge of the live lever 13 and carrying at its lower end a spool 37 adapted to travel along the under side of the casing or strut forming the sides of the housing 26. A plurality of turns intermediate the upper and lower ends of this spring surround the pin 33 whereby the spring is tensioned on application of the brakes in which the angle formed by the strut and live lever changes. This relative change in the angular relation of the parts causes a peculiar turning action, producing localized tension of the spring adjacent the pin 33 which will tend to restore the parts to normal position on release of the braking power.

The spool 37 bearing upon the under side of the strut is adapted to prevent binding at the point of contact between the strut and the spring as the slack is permanently taken up by the holding device, for it is to be understood that the pin 33 travels gradually along the slot 34 as wear of the brake shoes takes place.

The device operates in substantially the following manner: Upon application of the brakes the live lever moves toward the left under the action of the pull rod 15 and causes an opposite movement of the dead lever to bring the shoes carried by the brake beams 16 in contact with the peripheries of the wheels. This initial movement takes place without actuation of the slack adjuster mechanism by reason of the lost motion device provided by the friction clamp 23. If, however, excess travel takes place greater than that provided for by the lost motion device, a relative slipping will take place between the clamp 23 and the adjusting rod 22 to permit the efficient and desired operation of the brakes. On release of the braking power the live lever drops back toward its original position so far as permitted by the lost motion device under the action of the return spring 35 thus bringing the shoes clear of the wheels. If excess travel has taken place the friction clamp will prevent further movement of the adjusting rod 22 toward the right and hold the housing 26 in relatively fixed position. The return spring however continues to act to restore the angular relation originally existing between the strut and live lever and as the housing is prevented from moving, the holding rod 31 contained therein will be drawn toward the right an amount corresponding to this excess travel at which point the stop member 14 located at the upper end of the live lever will coact with the bolster and arrest further movement.

This operation is repeated from time to time as may be necessary to take up the slack and when it is found desirable to replace the worn brake shoes the dogs are released from their gripping position on the holding rod by moving them to vertical position in any desired manner, whereupon the rod 31 may be forced toward the left to its original position. This dog release mechanism, although not shown, is preferably operable from the side of the truck and may be applied to the housing if so desired, thus avoiding the necessity of having an operator go in under the car as fully disclosed in my copending application Serial Number 74,176. After the new shoes have been applied to the brake shoe heads an application of the brakes will bring the same to proper adjustment.

It is thus seen that the present invention provides a simple, practical and efficient automatic slack adjuster that may be readily applied to truck rigging of standard type. The invention involves relatively few parts which are cheap to manufacture and install and is believed to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In a slack adjuster, in combination, a live lever, a dead lever, a push rod connecting the lower ends of said levers, a housing mounted upon a brake beam having holding devices associated therewith, a holding rod connected with the live lever and having a telescoping engagement with the housing, and an adjusting device connected with said housing at one end and said push rod at its other.

2. In a slack adjuster, in combination, a brake beam, a lever, a push rod connected with the end of said lever, a housing mounted upon the brake beam having holding devices associated therewith, a holding rod connected with the lever and having a telescoping engagement with the housing, and an adjusting device between the push rod and the housing, the connection between such adjusting device and push rod being provided with a lost motion device to insure brake shoe clearance.

3. In a slack adjuster, in combination, a live lever, a push rod connected therewith, a brake beam, a housing mounted upon the brake beam having holding devices associated therewith, a holding rod connected with the live lever and coacting with the housing, an adjusting device between the push rod and the housing, the connection between such adjusting rod and push rod being provided with a lost motion device to insure brake shoe clearance, and a friction clamp yieldable in both directions associated with said adjusting rod adapted to be operated on excess travel of the brakes.

4. In a slack adjuster in combination, a live lever, a dead lever, a non-extensible push rod connecting said levers, a brake beam and strut associated with each of said levers, a housing rotatably mounted upon one of the beams, a take up rod co-acting with said housing and pivotally connected with the live lever, and an adjusting rod between the housing and the push rod.

5. In a slack adjuster, in combination, a brake beam strut, including a rotatably mounted housing, a holding rod coacting with said housing, and an adjusting rod associated with one of said parts.

6. In a slack adjuster, in combination, a live lever, a dead lever, a push rod connecting said levers, a brake beam and strut associated with each of said levers, a holding device mounted on one of the struts, adjacent the brake beam, a holding rod coacting with said device and pivotally connected with the live lever, an adjusting rod between the device and the push rod, and a friction clamp associated with said push rod at its point of connection with the adjusting rod.

7. In a slack adjuster, in combination, a live lever, a brake beam associated therewith, a strut rotatably connecting the beam and lever and provided with longitudinal slots to permit angular and longitudinal relative movement of said lever, a permanent take up and holding device associated with said strut, and a holding rod between the holding device and the live lever.

8. In a slack adjuster, in combination, a live lever, a brake beam, a rotatable strut on the beam provided with longitudinal slots to permit angular and longitudinal relative movement of said lever, a permanent take up and holding device near the end of said strut, a holding rod between the holding device and the live lever, said rod being pivotally connected with the live lever at the point of connection between the strut and the live lever.

9. In a slack adjuster, in combination, a live lever, a pull rod connected to the upper end of said live lever, a stop associated with the point of connection adapted to coact with the car bolster to limit the return movement, a dead lever pivotally connected at the opposite side of the bolster, a push rod connecting the lower ends of said levers, brake beams, pivotally mounted struts associated with the levers and connected with said beams, a permanent take up and holding device mounted upon one of the struts, and adjusting mechanism coacting with said holding device and having a lost motion connection with the push rod.

10. In an automatic slack adjuster, in combination, a brake beam, and a take up and holding device rotatively connected therewith.

11. In an automatic slack adjuster, in combination, a brake beam, a brace connected therewith, and a housing positioned between the brace and beam and having a rotatable connection therewith.

12. In an automatic slack adjuster, in combination, brake beams, struts rotatably connected therewith, and levers associated with said struts whereby they may turn relatively thereto by reason of said rotatable connections.

13. In a slack adjuster, in combination, a brake beam strut including two parts rotatably connected with each other, one of said parts forming a housing containing permanent take up and holding mechanism, a holding rod coacting with said housing, and an adjusting rod connected at one end with said housing adapted to temporarily hold the same in relatively fixed position while the excess travel of the brake rigging is being permanently taken up.

Signed at New York, in the county of New York and State of New York, this 16th day of December, A. D. 1915.

WILLIAM H. SAUVAGE.

Copies of this patent may be obtained for five cents each, by addressing the "Commissioner of Patents, Washington, D. C."